United States Patent [19]
Gibson et al.

[11] Patent Number: 5,551,398
[45] Date of Patent: Sep. 3, 1996

[54] ELECTRONICALLY-CONTROLLED FLUID INJECTOR SYSTEM HAVING PRE-INJECTION PRESSURIZABLE FLUID STORAGE CHAMBER AND DIRECT-OPERATED CHECK

[75] Inventors: Dennis H. Gibson, Chillicothe; Gregory W. Hefler, Dunlap; Ronald D. Shinogle, Peoria; Mark F. Sommars, Sparland, all of Ill.

[73] Assignee: Caterpillar Inc., Peoria, Ill.

[21] Appl. No.: 438,858

[22] Filed: May 10, 1995

Related U.S. Application Data

[63] Continuation of Ser. No. 242,501, May 13, 1994.

[51] Int. Cl.⁶ .................................................. F02M 37/04
[52] U.S. Cl. .......................... 123/446; 123/496; 123/500
[58] Field of Search ..................... 123/446, 447, 123/506, 467, 500–501, 496; 239/88–96

[56] References Cited

U.S. PATENT DOCUMENTS

| | | | |
|---|---|---|---|
| 3,570,807 | 3/1971 | Sturman et al. | 251/65 |
| 4,211,202 | 7/1980 | Hafner | 123/457 |
| 4,628,881 | 12/1986 | Beck et al. | 123/446 |
| 5,046,472 | 9/1991 | Linder | 239/585.2 |
| 5,235,954 | 8/1993 | Sverdlin | 123/447 |

FOREIGN PATENT DOCUMENTS

| | | |
|---|---|---|
| 0133203 | 2/1985 | European Pat. Off. . |
| 0174083 | 3/1986 | European Pat. Off. . |
| 0174718 | 3/1986 | European Pat. Off. . |
| 0240353 | 10/1987 | European Pat. Off. . |
| 0269289 | 6/1988 | European Pat. Off. . |
| 0675282 | 10/1995 | European Pat. Off. . |
| 1132403 | 10/1968 | United Kingdom . |
| 1397114 | 6/1975 | United Kingdom . |
| 2003977 | 3/1979 | United Kingdom . |

*Primary Examiner*—Thomas N. Moulis
*Attorney, Agent, or Firm*—Anthony N. Woloch; Mark D. Becker

[57] ABSTRACT

An improved electronically-controlled fluid injector system comprises a fluid storage chamber and a direct-operated check. Pressurization of fluid in the storage chamber begins before the start of fluid injection. Fluid injection begins by hydraulically unbalancing the check. Fluid injection sharply ends by hydraulically balancing the check to allow a biasing device to close the check.

The present invention provides improved control of several fluid injection parameters, including higher peak fluid injection capability and less fluid injection pressure drop at the end of injection, resulting in improved engine performance and lower emissions, noise, and wear.

24 Claims, 11 Drawing Sheets

Fig_4

Fig_5_

Fig_6

Fig_7_

ELECTRONICALLY-CONTROLLED FLUID INJECTOR SYSTEM HAVING PRE-INJECTION PRESSURIZABLE FLUID STORAGE CHAMBER AND DIRECT-OPERATED CHECK

This is a continuation of a prior filed patent application Ser. No. 08/242,501, filed May 13, 1994.

TECHNICAL FIELD

The present invention relates generally to fluid injection and, for example, more particularly to electronically-controlled fuel injectors.

BACKGROUND ART

Examples of conventional electronically-controlled fuel injection systems are shown in U.S. Pat. No. 4,392,612 issued to Deckard et al. on Jul. 12, 1983, U.S. Pat. No. 5,094,215 issued to Gustafson on Mar. 10, 1992, and U.S. Pat. No. 5,156,132 issued to Iwanga on Oct. 20, 1992.

In Deckard et al., the mechanically-actuated injector is constructed and operates in such a way so peak fuel injection pressure is drastically reduced as engine speed is reduced if fuel delivery (i.e., quantity during an injection cycle) is kept constant. The direct relationship between peak injection pressure and engine speed, associated with this type of injector limits desirably higher fuel injection pressures to be attained at lower engine speeds and/or lighter loads. This consequently limits the engine's ability to achieve lower emissions, especially with respect to smoke or particulates.

In Gustafson, the injector has a conventional spring-loaded check which has a fixed valve closing pressure (VCP). A problem with a fixed VCP is the time delay associated with closing the check as the fuel injection pressure bleeds down to the VCP. The time delay and pressure drop can cause poor atomization of fuel injected into the engine combustion chamber late in the combustion cycle. A sharper end of injection Would be desirable for reducing emissions, especially particulates or smoke. Moreover in Gustafson, the injector also has a variable-volume fuel pressurization chamber (36) whose volume is determined by a complex two-part plunger assembly (24) having a spring (38) as well as an external apparatus for varying the pressure of fuel supplied to the injector. Manufacturing variations in the spring rate as well as the variable pressure apparatus may cause imprecise control of the variable volume (36) resulting in imprecise control of the fuel injection quantity, peak fuel injection pressure and pressure decay or drop during an injection cycle.

In Iwanga, fuel injection pressure is used to assist closure of the movable check for ending fuel injection. One problem that may occur is unacceptably high impact loading of the check against the nozzle tip seat at high injection pressures thereby causing failure or breakage of the nozzle tip. Thus, peak fuel injection pressure capability of the injector is undesirably limited.

The present invention is directed to overcoming one or more of the problems as set forth above.

DISCLOSURE OF THE INVENTION

In one aspect of the present invention, an electronically-controlled fluid injector system is disclosed comprising a fluid control passage, a fluid storage chamber, a first valve portion, a fluid pressurization member, at least one fluid injection orifice, a direct-operated check, and a second valve portion which may be separate or integral with the first valve portion. The first valve portion selectively opens and closes fluid communication between the storage chamber and the control passage. When the first valve portion is opened, the pressurization member is selectively displaces a variably selected volume of fluid from the storage chamber to the control passage. When the first valve portion is closed, the pressurization member selectively displaces another variably selected volume of fluid trapped in the storage chamber thereby pressurizing such fluid to a variably selected pressure. The check selectively closes and opens fluid communication between the storage chamber and the fluid injection orifice. Injection of pressurized fluid occurs through the fluid injection orifice when the second valve portion causes hydraulic unbalancing of the check to open the check. Injection of pressurized fluid ends. When the second valve portion causes hydraulic balancing of the check allowing closure of the check.

In another aspect of the present invention, an electronically-controlled unit fluid pump injector is disclosed in which the above elements are unitized in a single housing assembly.

The present invention provides improved control of several fluid injection parameters resulting in improved engine performance and lower emissions, noise, and wear.

BEST MODE FOR CARRYING OUT THE INVENTION

Figure 1:
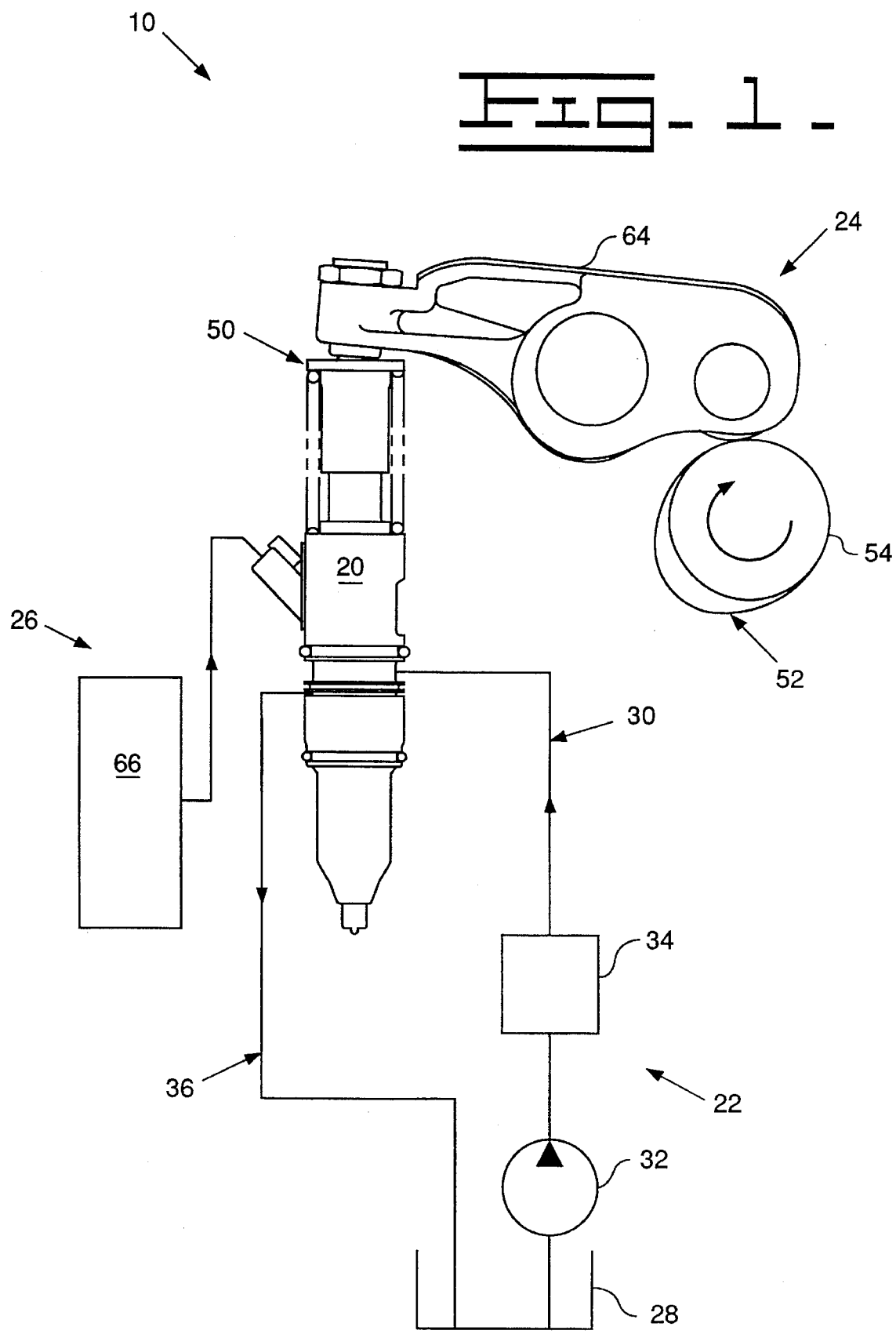
FIG. 1 is a diagrammatic general schematic view of an electronically-controlled fuel injector system of the present invention.

Referring to FIGS. 1–7, wherein similar reference numerals designate similar elements or features throughout the FIGS., there is shown an embodiment of an electronically-controlled fuel injection system 10 of the present invention (hereinafter referred,to as an EUI-II fuel system).

Figure 2:
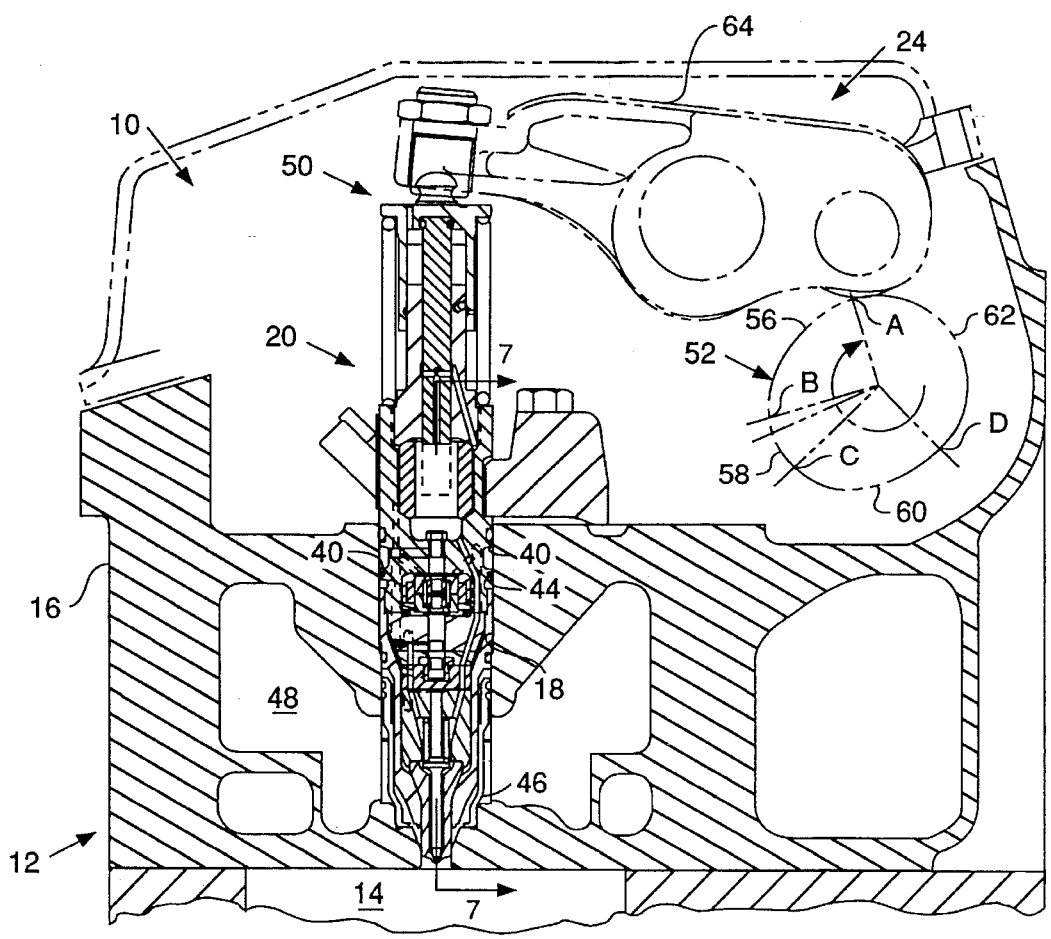
FIG. 2 is a diagrammatic partial cross-sectional view of one embodiment of an injector of the present invention as installed in an exemplary internal combustion engine.
Figure 3:
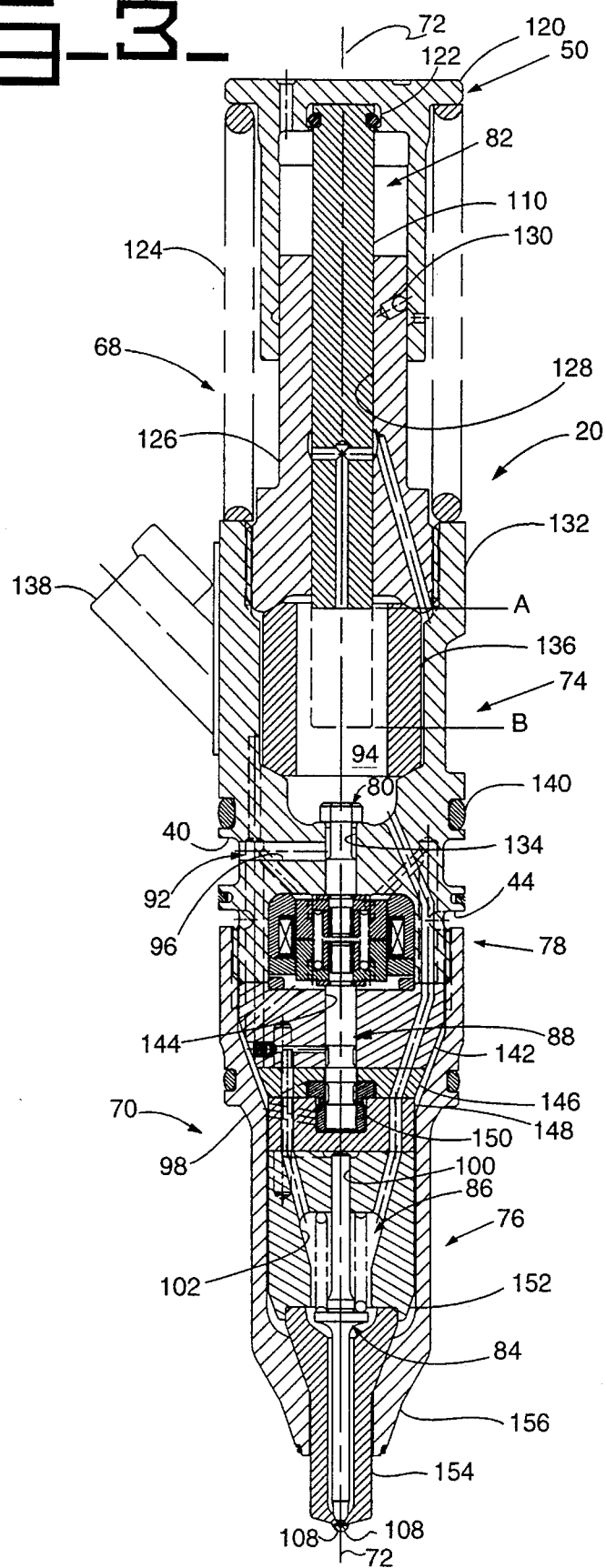
FIG. 3 is a diagrammatic isolated enlarged cross-sectional view of the injector shown in FIG. 2.
Figure 4:
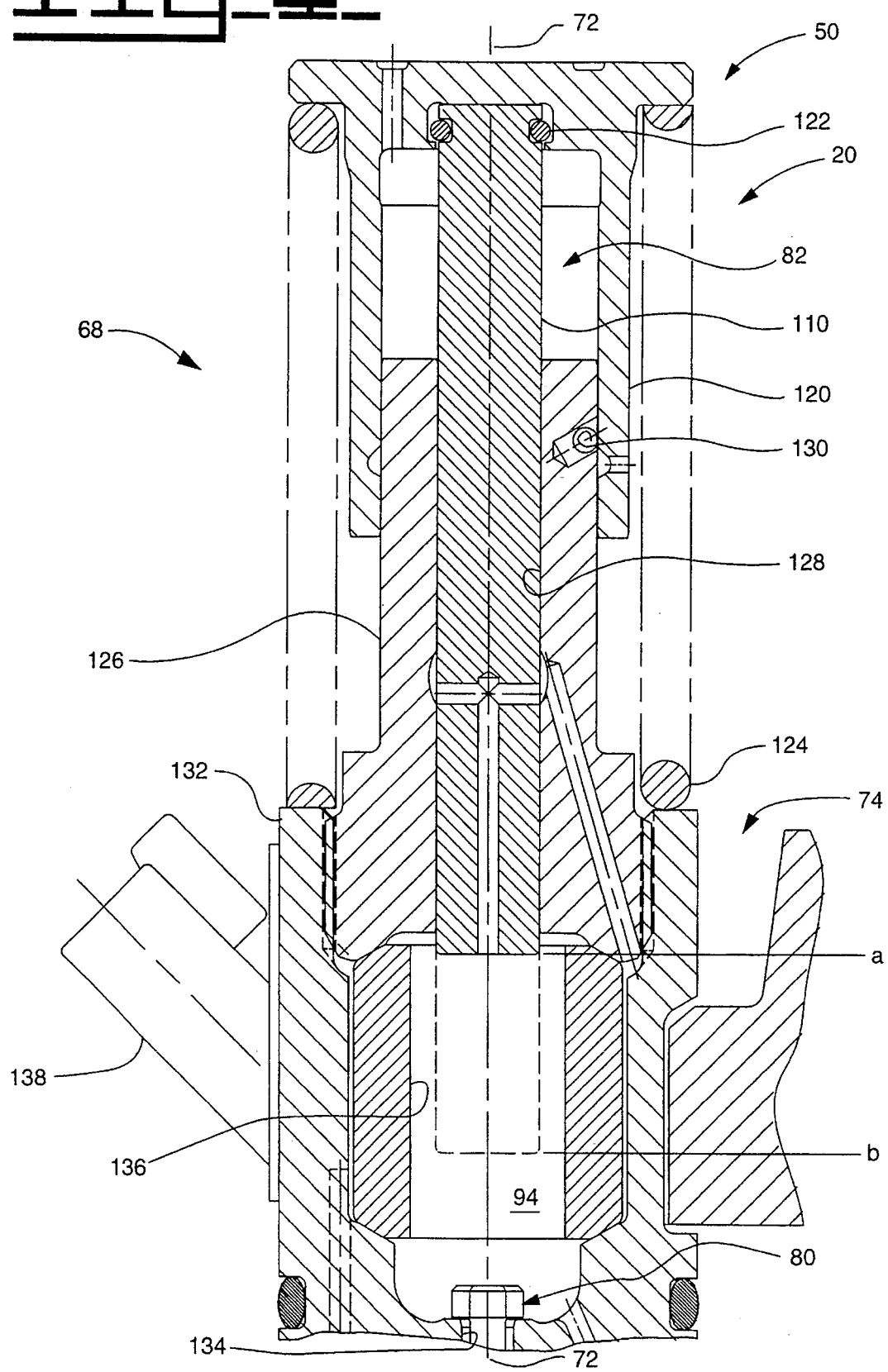
FIG. 4 is a diagrammatic enlarged cross-sectional partial view of a first or upper portion of the injector shown in FIG. 3.
Figure 5:
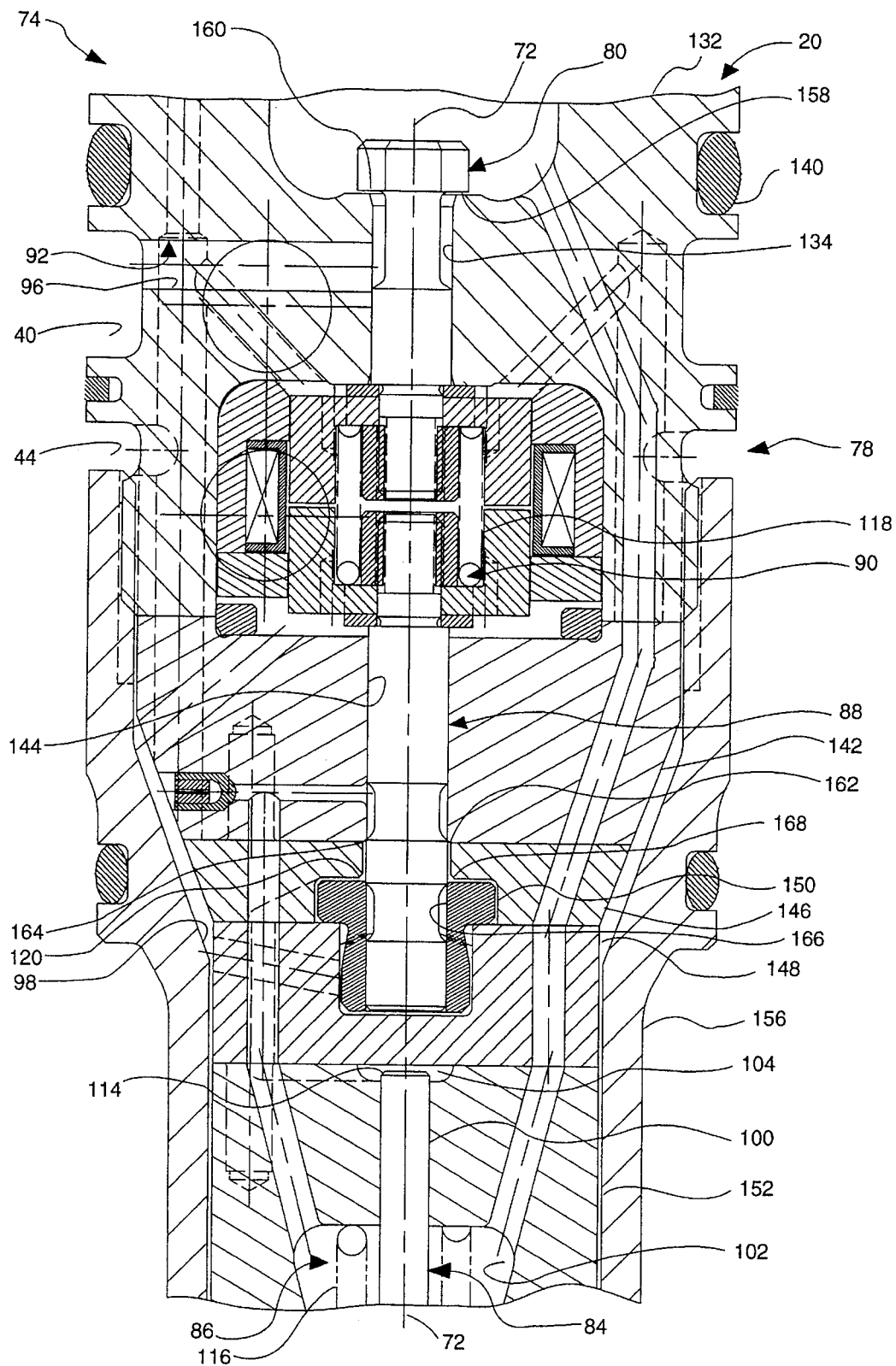
FIG. 5 is a diagrammatic further enlarged cross-sectional partial view of a second or intermediate portion of the injector shown in FIG. 3.
Figure 6:
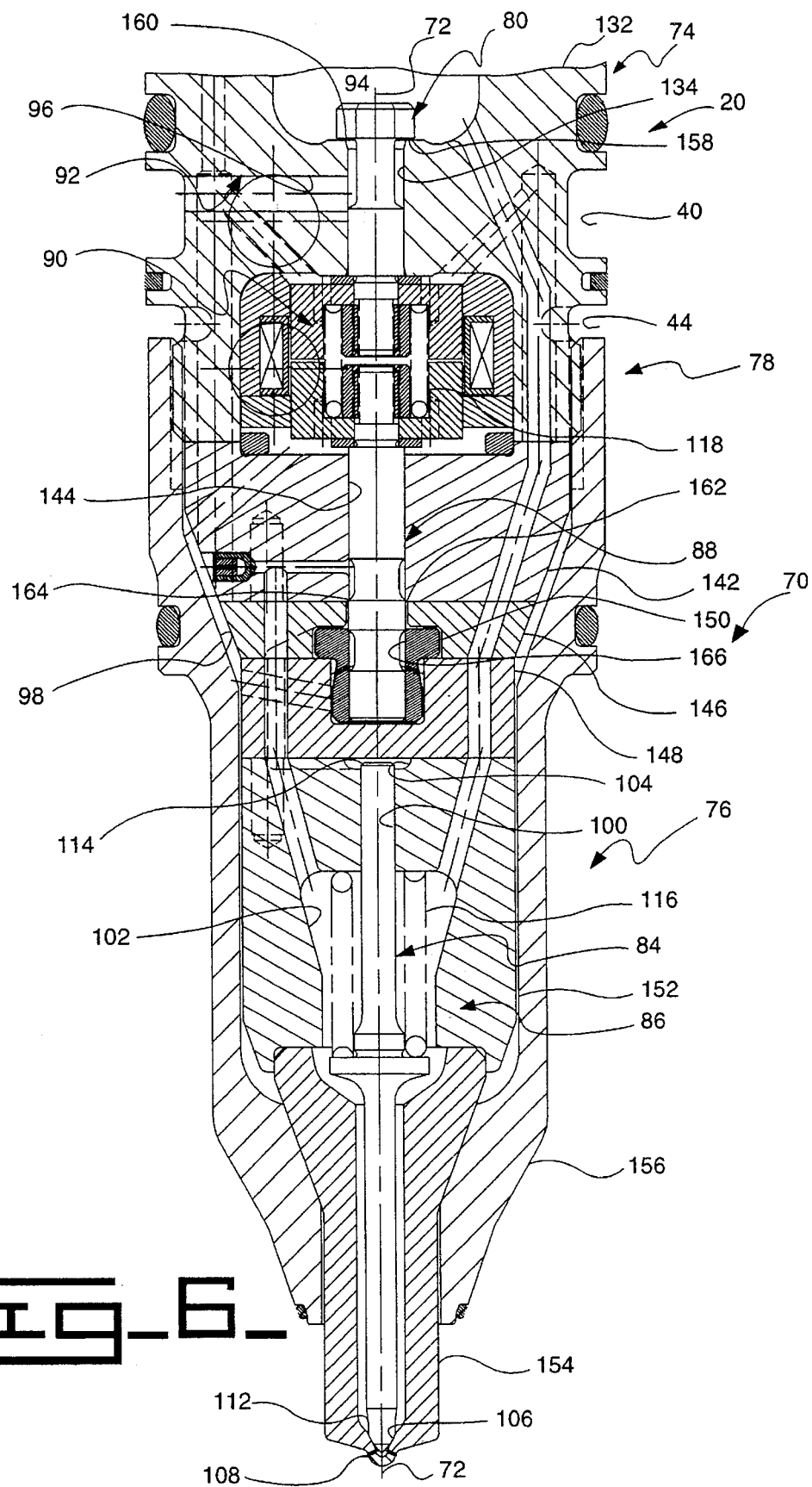
FIG. 6 is a diagrammatic enlarged cross-sectional partial view of a third or lower portion of the injector shown in FIG. 3.
Figure 7:
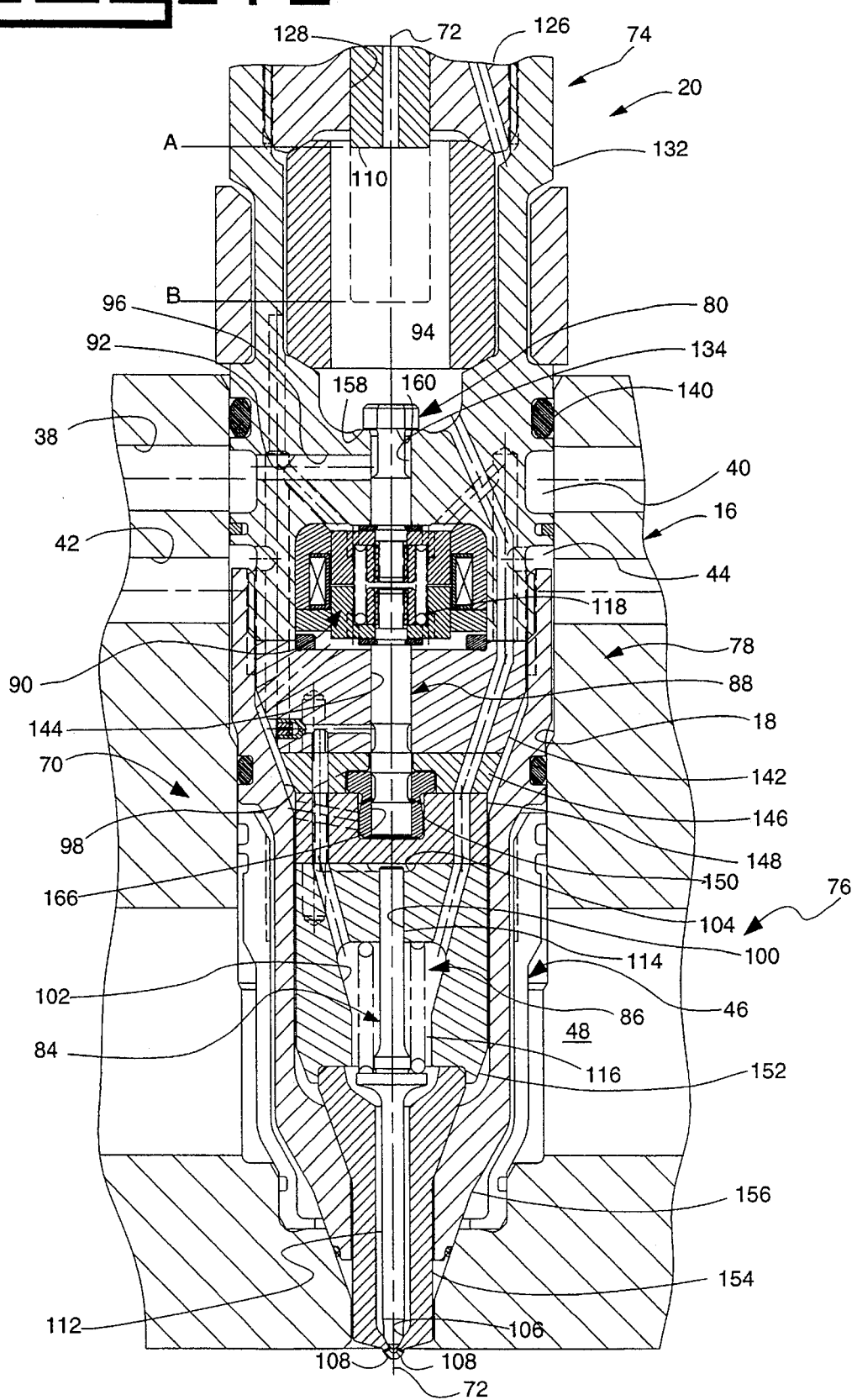
FIG. 7 is a diagrammatic enlarged cross-sectional partial view of FIG. 2 taken generally along line 7—7.

The exemplary EUI-II fuel system 10 is shown in FIGS. 1–2 as adapted for a direct-injection diesel-cycle reciprocating internal combustion engine 12. However, it should be understood that the present invention is also applicable to other types of engines, such as rotary engines or modified-cycle engines, and that the engine may contain one or more engine combustion chambers 14 or cylinders. The engine 12 has at least one cylinder head 16 wherein each cylinder head 16 defines one or more separate injector bores 18. The EUI-II fuel system 10 includes one or more electronically-controlled injectors 20 adapted to be positioned in a respective injector bore 18.

The EUI-II fuel system 10 further includes apparatus or means 22 or apparatus for supplying fuel to each injector 20, apparatus or means 24 for actuating each injector, and apparatus or means 26 for electronically controlling each injector.

The fuel supplying means 22 preferably includes a fuel tank 28, a fuel supply passage 30 arranged in fluid communication between the fuel tank and the injector(s), a relatively low pressure fuel transfer pump 32, one or more fuel filters 34, and a fuel drain passage 36 arranged in fluid communication between the injector(s) 20 and the fuel tank 28. Preferably, each cylinder head 16 defines an internal fuel supply passage 38 which communicates with the annular fuel inlet 40 of each injector 20 associated with the cylinder head 16. Preferably, each cylinder head 16 defines an internal fuel drain passage 42 which communicates with the fuel outlet 44 of each injector associated with the cylinder head 16. Alternatively, the fuel supply passage 38 and the fuel drain passage 42 defined in the cylinder head 16 may be a single passage. Optionally, a sleeve 46 may be sealedly positioned in the injector bore 18 between the injector 20 and the cylinder head 16 to separate internal coolant chambers 48 of the cylinder head 16 from the injector 20.

The actuating means 24 may be any mechanically actuating-device or hydraulically-actuating device. In the embodiment shown, a tappet and plunger assembly 50 associated with the injector 20 is mechanically actuated indirectly or directly by a rotatable cam or cam lobe 52 mounted on an engine-driven camshaft 54.

The profile of the cam surface depends upon, inter alia, the desired timing of plunger movement, plunger stroke, type of cam follower, engine speed, and range of operating injection pressure. For example, the profile may include a plurality of segments including i) a first segment 56 extending between points A to B for moving the pressurization member from its first position toward its second position; a second segment 58 extending between points B to C for actuating the pressurization member during injection, iii) a third segment 60 extending between points C to D for moving the pressurization member from its second position toward its first position, and iv) a fourth segment 62 for maintaining the pressurization member at its first position D to A. In the embodiment shown, the cam 52 drives a rocker arm assembly 64 which in turn reciprocates a tappet associated with the injector 20. Alternatively, a pushrod (not shown) may be positioned between the cam 52 and the rocker arm assembly 64. Alternatively, a pushrod (not shown) may be positioned between the rocker arm assembly 64 and the tappet.

The electronic controlling means 26 or apparatus preferably includes a electronic control module 66 which controls 1) the fuel injection timing, 2) the total fuel injection quantity during an injection cycle, 3) the fuel injection pressure, 4) the number of separate injections or injection segments during an injection cycle, 5) the time interval(s) between the injection segment(s), 6) the fuel quantity of each injection segment during an injection cycle; and 7) any combination of the above parameter(s) between a plurality of injectors 20. Each of the above parameters are variably controllable independent of engine speed and loading.

Preferably, each injector 20 is a unit injector wherein both a fuel pressurization device 68 and a fuel injection device 70 are housed in the same unit. Although shown here as a unitized injector 20, alternatively, the injector could be of a modular construction with the fuel injection device 70 positioned separate from the fuel pressurization device 68. The injector 20 includes an imaginary longitudinal centerline axis 72 for reference purposes.

The injector 20 includes a housing portion 74, a nozzle portion 76, an electrical actuation means or device(s) 78, an electronically-controlled first pressure control valve 80, a reciprocal fuel pressurization member 82, a direct-operated check 84, a first biasing device 86, an electronically-controlled second pressure control valve 88, and a second biasing device 90.

The housing portion 74 defines a fuel control passage 92 and an integral fuel storage chamber 94. The internal fluid volume of the storage chamber 94 is preferably fixed and sized depending upon, inter alia, the desired maximum fuel quantity injected during an injection cycle, the desired peak fuel injection pressure during an injection cycle, the desired fuel injection pressure decay or drop during an injection cycle, the bulk modulus of the fuel, and the displacement of the pressurization member 82 (i.e., stroke and effective area). The control passage 92 generally refers to a either a relatively-low pressure fuel supply passage 96 or a relatively-low pressure fuel drain passage 98 defined in the injector 20.

The electrical actuation means 78 is provided for controlling the positions of the first and second valves 80,88. The electrical actuation means 78 is selectively de-energized or energized. For example, the electrical actuation means 78 may include a single solenoid a plurality of solenoids. Alternatively, the means 78 may include a piezoelectric device. The first valve 80 is preferably positioned in the storage chamber 94 and selectively movable between a de-energized first position and an second position. At its first position, the first valve 80 opens fluid communication between the storage chamber 94 and the control passage 96. The first valve 80 is energized to move from its first (opened)

position to its second (closed) position. At its closed position, the first valve 80 blocks fluid communication between the storage chamber 94 and the control passage 96.

The nozzle portion 76 defines a bore 100, an injection chamber 102 integral with or arranged in fluid communication with the storage chamber 94, a pressure control chamber 104 separate from the injection chamber 102 and storage chamber 94, a tip seat 106, and at least one fuel injection orifice 108.

In the embodiment shown, the pressurization member 82 preferably includes a reciprocal plunger 110. The plunger 110 is preferably positioned in the storage chamber 94 and is selectively movable between a first position and a second position. When the first valve 80 is opened (i.e., its first position), the plunger 110 is operable during movement from its first to second positions for displacing a first variably-selected volume of fuel from the storage chamber 94 to the control passage 96. When the first valve 80 is closed (i.e., its second position) the plunger 110 is operable during movement from its first to second positions for displacing a second variably-selected volume of fuel in the storage chamber 94 thereby pressurizing such fuel to a selected variable pressure. Stated differently, after the first valve 80 is closed, the plunger 110 compresses the fuel to a controlled volume which is less than the fixed volume. To control or minimize torsional loads in a mechanical drivetrain which actuates the plunger 110, the cam profile is preferably chosen to begin movement of the plunger 110 from its first to second positions before initial fuel injection begins in an injection cycle. This also provides a variably selected injection pressure at the beginning of injection. In order to increase the mean effective injection pressure produced by the injector 20, the cam profile is preferably chosen as generally shown in FIG. 2 to continue moving the plunger 110 from its first to second positions (A to B) during fuel injection of an injection cycle. Alternatively as shown in FIG. 1, the cam profile can be chosen to complete movement of the plunger 110 from its first to second positions prior to initial fuel injection of an injection cycle.

The check 84 is preferably positioned in the bore of the nozzle portion and selectively movable between a first position blocking fluid communication between the injection chamber 102 and the fuel injection orifice 108 and a second position opening fluid communication between the injection chamber 102 and the fuel injection orifice 108. The check 84 has a first end portion 112 and a second end portion 114. The first end portion 112 defines a first effective area arranged in partial fluid communication with the injection chamber 102 when the check 84 is closed (i.e., its first position). The first effective area is arranged to be in complete fluid communication with the injection chamber 102 when the check 84 is opened (i.e., its second position). The second end portion 114 defines a second effective area arranged in fluid communication with the pressure control chamber 104. The first biasing device 86 preferably includes a first mechanical spring 116 is operable for biasing the check 84 towards its closed or first position.

The second valve 88 is selectively movable between a de-energized first position and an energized second position. Preferably, the second valve 88 is a three-way valve such as a poppet valve or spool valve. The second valve 88 at its first position blocks fluid communication between the pressure control chamber 104 and the control passage 98 and opens fluid communication between the pressure control chamber 104 and the injection chamber 102. The second valve 88 at its second position opens fluid communication between the pressure control chamber 104 and the fuel control passage 98 and blocks fluid communication between the pressure control chamber 104 and the injection chamber 102. When the check 84 is closed and the second valve 88 is at its second position, the first and second effective areas are operable for hydraulically moving the check 84 towards its second (opened) position. When the check 84 is at its second (opened) position and the second valve 88 is at its first position, the first and second effective areas are operable for balancing opposing hydraulic forces acting on such effective areas thereby allowing the first biasing device 86 to move the check 84 towards its first (closed) position.

The second biasing device 90 preferably includes a second mechanical spring 118 for biasing both the first and second valves 80,88 towards their respective first positions. Alternatively, the second biasing device 90 maybe a plurality of springs biasing the respective first and second valves towards their respective first positions.

In the embodiment shown in FIGS. 1–7, the injector also includes a tappet 120, a first retainer 122 positioned between the plunger 110 and the tappet 120, a tappet return:spring 124, a barrel 126 defining a bore 128 in which the plunger 110 reciprocates according to a predetermined tight clearance, a second retainer 130 positioned between the barrel 126 and the tappet 120, a housing 132 connected to the barrel 126 and defining a bore 134 in which the first valve 80 reciprocates according to a relatively loose clearance, a sleeve 136 sealedly positioned between the barrel 126 and the housing 132, an electrical connector 138 electrically connected to the electrical actuation device 78, an upper seal 140, an upper stop 142 defining a bore 144 in which the second valve 88 reciprocates according to a predetermined tight clearance, a spacer 146, a lower stop 148, a popper sleeve 150 positioned between the spacer 146 and the lower stop 148, a body 152 defining the bore 100 in which the check 84 reciprocates according to a preselected tight clearance, a tip 154 which defines the tip seat 106 and the injection orifice(s) 108, and a case 156 connected to the housing 132.

The housing 132 and first valve 80 each define a seat 158,160 which sealedly contact one another when the first valve 80 is closed.

The upper stop 142 and second valve 88 each define a seat 162,164 which sealedly contact one another when the second valve 88 is at its second position. The poppet sleeve 150 and second valve 88 each define a separate seat 168,170 which sealedly contact one another when the second valve 88 is at its first position.

Preferably, the poppet sleeve 150 defines a bore 166 in which the second valve 88 reciprocates according to a predetermined tight clearance. Preferably, the popper sleeve 150 is loosely positioned, in the axial and radial directions, between the spacer 146 and the lower stop 148.

Preferably, the electrical actuation device 78 is connected to the housing 132. The upper stop 142, spacer 146, lower stop 148, body 152, and tip 154 are retained between the case 156 and the housing 132.

Industrial Applicability

In operation, before an injection cycle begins, the electrical actuation device 78 or solenoid is normally de-energized so that the first valve 80 is opened and the second valve 88 is at its first position. The check 84 is at its first (closed) position. The opened first valve 80 allows the fuel storage chamber 94 and the injection chamber 102 to be filled with relatively low pressure fuel provided by the pressure control passage 96.

The plunger 110, driven by the first segment 56 (A–B) of the cam 52, begins its stroke from its retracted first position A. At a selected amount of plunger stroke, the solenoid 78 is energized causing closure of the first valve 80 and movement of the second valve 88 to its second position. The solenoid 78 preferably remains energized until the fuel pressure in the storage chamber 94 reaches a level sufficient to hydraulically hold the first valve 80 closed. The solenoid 78 is then de-energized allowing the second spring 118 to return the second valve 88 to its first position. The fuel pressure in the storage chamber 94 and the injection chamber 102 continues to increase to a variably selected pressure due to continued stroking of the plunger 110. With the second valve 88 at its first position, high pressure fuel communicates with the pressure control chamber 104 from the injection chamber 102 between opened seats 162,164.

With the check 84 seated, the second effective area exposed to high fuel pressure is greater than the first effective area exposed to high fuel pressure thereby preventing the check 84 from opening.

To start injection, the solenoid 78 is again energized thereby moving the second valve 88 to its second position. This closes seats 164,162 of the second valve and upper stop. This also opens seats 170,168 of the second valve 88 and the poppet sleeve 150 communicating the pressure control chamber 104 with the control pressure passage 98. By reducing the pressure in the pressure control chamber 104 and having high pressure in the injection chamber 102, the check 84 opens to begin fuel injection through the injection orifice(s) 108 and into the engine combustion chamber 14.

To end fuel injection, the solenoid 78 is again de-energized, moving the second valve 88 back to its first position and closing seats 170,168 of the second valve 88 and the poppet sleeve 150 to block fluid communication between the pressure control chamber 104 and the control pressure passage 98. Moreover, seats 164,162 of the second valve 88 and the upper stop 142 are opened communicating the pressure control chamber 104 with the injection chamber 102 thereby introducing high pressure fuel back into the pressure control chamber 104.

Preferably, the first and second effective areas of the check 84 are sized such that when the check 84 is opened and the second valve 88 is at its first position, the net hydraulic forces acting on the check 84 are effectively zero. In other words, the net opposing fluid pressures are equal and also the first and second effective areas on which such pressures act are equal. When the check 84 is opened, the force of the first spring 116 is preferably the only unbalanced force acting on the check 84, consequently biasing the check 84 toward its first (closed) position. At the end of a fuel injection cycle or injection segment, the force of the first spring 116 urges the check 84 from its opened position to its closed position at a selected velocity. The first spring force is preferably chosen to be sufficiently high for adequate check response yet sufficiently low to gently move the check 84 toward the tip seat 106 so that the check 84 does not overstress the tip 154 upon initial contact. Advantageously, the end of fuel injection during an injection cycle or segment is more precisely controlled since the velocity of the check 84 in the closing direction is primarily determined only by the force of the first spring 116 with minimal affect by the fuel injection pressure.

Figure 8:
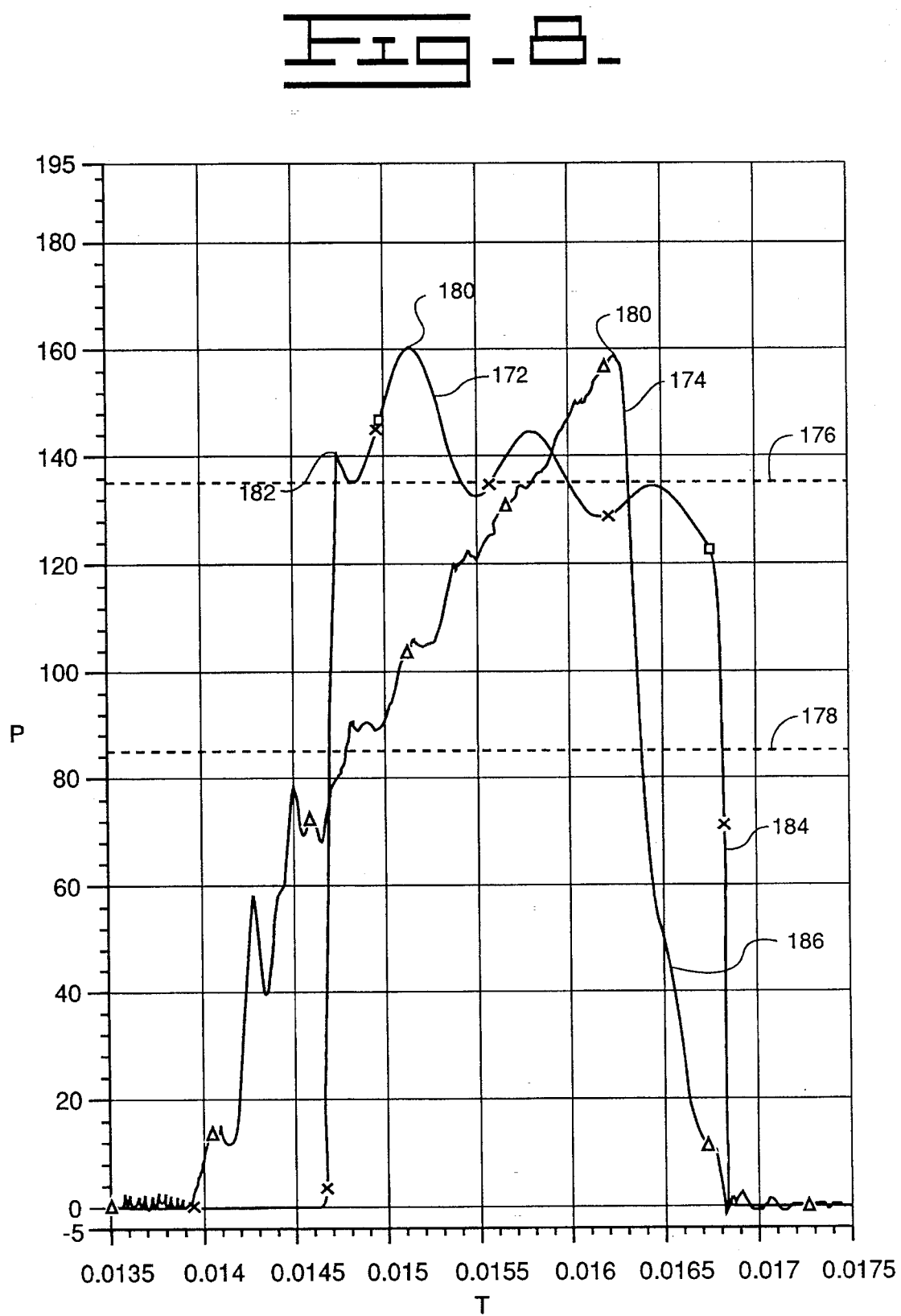
FIG. 8 is a diagrammatic approximate graph of fuel injection pressure, P measured in megapascals, versus time, T measured in seconds, comparing predicted operation of a computer-simulated exemplary injector of the present invention versus actual operation of a bench-tested conventional electronically-controlled injector.

FIG. 8 is a diagrammatic approximate graph of fuel injection pressure, P measured in megapascals, versus time, T measured in seconds, comparing predicted operation of a computer-simulated exemplary injector 172 of the present invention versus actual operation of a bench-tested conventional electronically-controlled injector 174 adapted for a same engine. FIG. 8 shows that the subject invention produces a higher mean injection pressure 176 compared to the mean injection pressure 178 of the conventional injector for approximately the same peak injection pressure 180. Moreover, a higher initial injection pressure 182 is available with the subject invention at the beginning of fuel injection. Moreover,the subject invention produces a sharper or more abrupt end of injection 184 compared to the end of injection 186 conventional injector.

Figure 9:
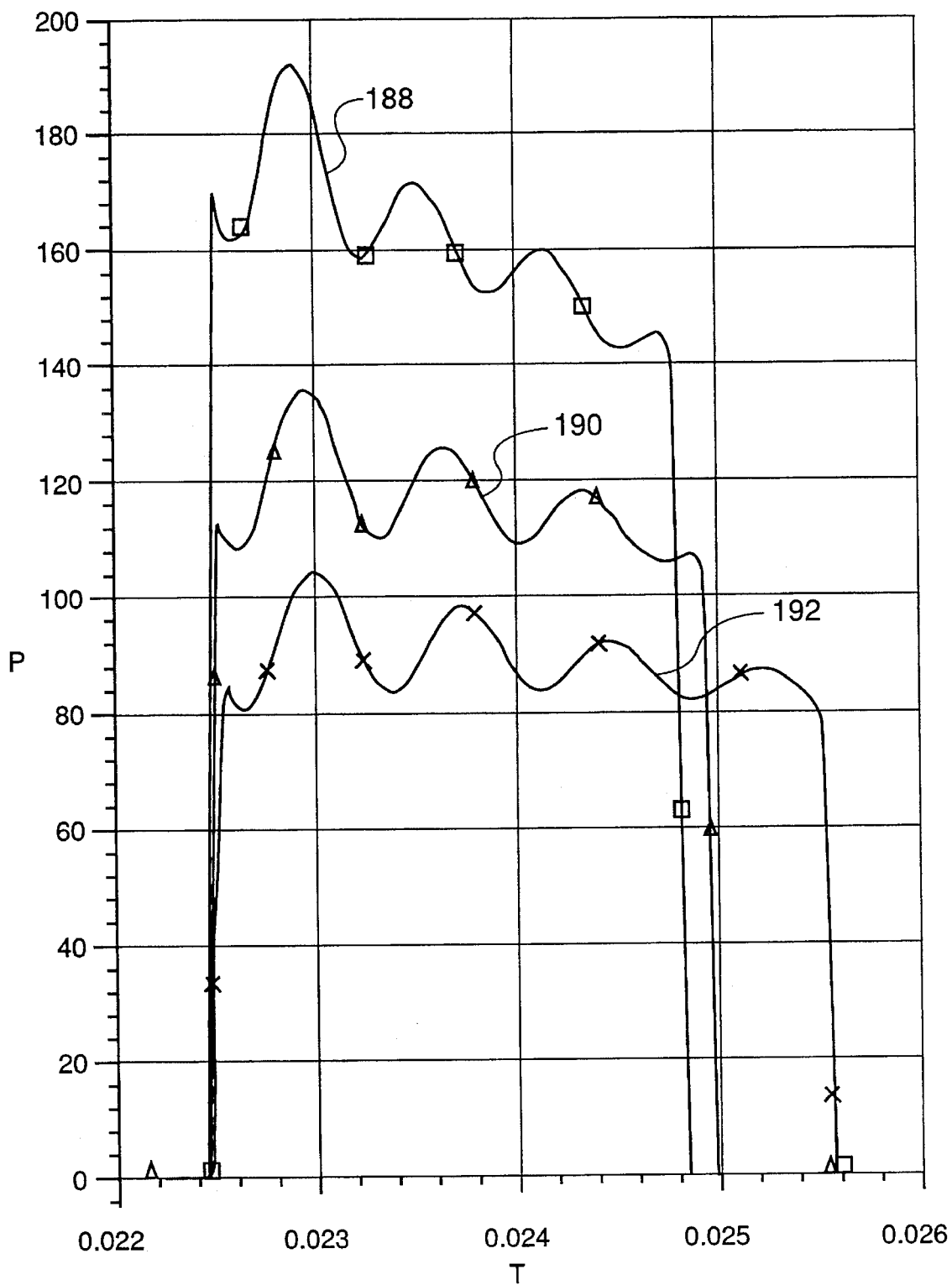
FIG. 9 is a diagrammatic approximate graph of fuel injection pressure P versus time T comparing predicted operations of a computer-simulated exemplary injector of the present invention operating at three different exemplary injection pressures but delivering approximately the same quantity of fuel per injection.

FIG. 9 is a diagrammatic approximate graph of fuel injection pressure, P measured in megapascals, versus time, T measured in seconds, comparing predicted operations of a computer-simulated exemplary injector of the present invention operating at three different exemplary injection pressures 188,190,192 but delivering approximately the same quantity of fuel per injection. FIG. 9 shows the subject invention is capable of varying peak fuel injection pressure independent of engine and load.

Figure 10:
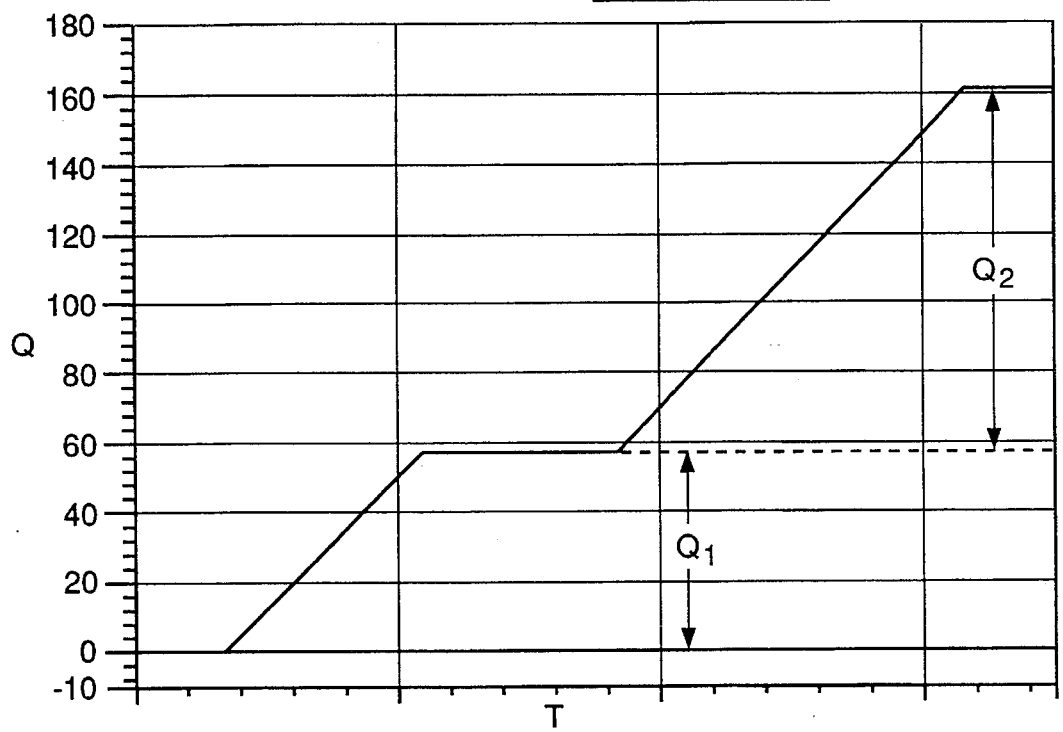
FIG. 10 is a diagrammatic approximate graph of cumulative fuel quantity Q versus time T showing predicted dual-type segmented injection operation during an injection cycle of a computer-simulated exemplary injector of the present invention.
Figure 11:
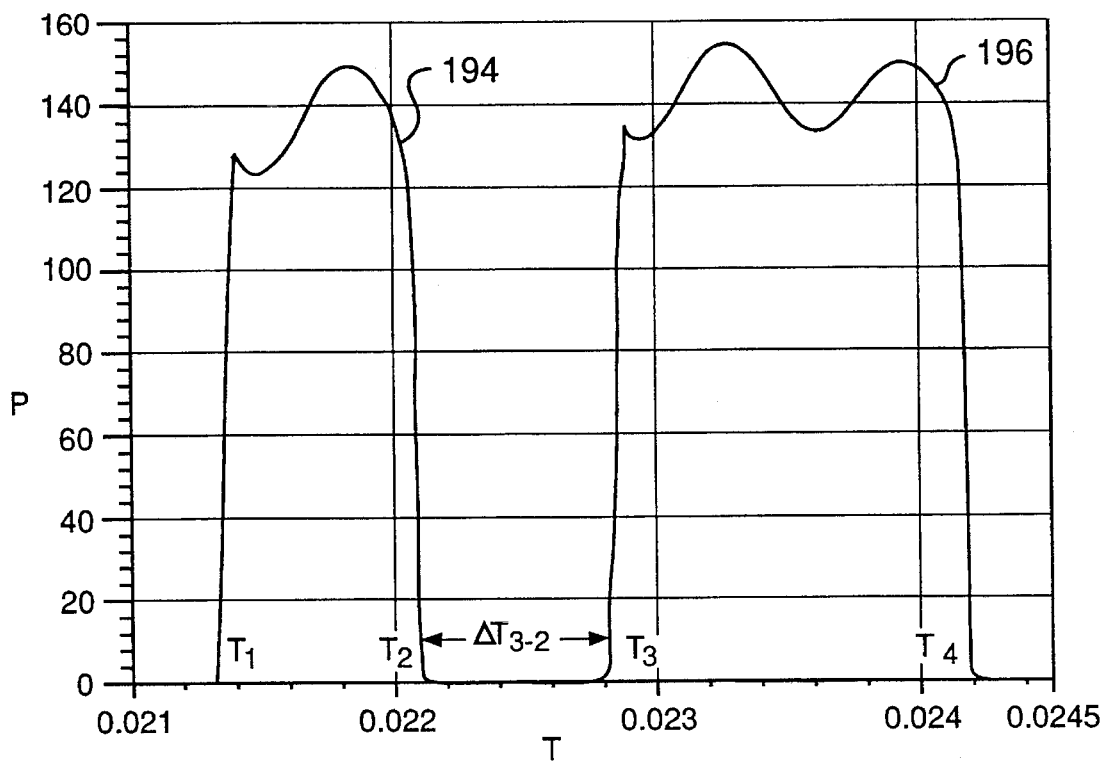
FIG. 11 is a diagrammatic approximate graph of fuel injection pressure P versus time T showing predicted operation corresponding to FIG. 10.

FIG. 10 is a diagrammatic approximate graph of cumulative fuel quantity, Q measured in cubic millimeters, versus time, T measured in seconds, showing predicted dual-type segmented injection operation of a computer-simulated exemplary injector of the present invention. FIG. 11 is a diagrammatic approximate graph of fuel injection pressure, P measured in megapascals, versus time, T measured in seconds, showing predicted operation corresponding to FIG. 10. In FIG. 11, a first injection segment 194 and a separate second injection segment 196 are shown. The subject invention is capable of variably controlling the fuel quantity, $Q_1$ and/or $Q_2$, of each separate fuel injection segment 194,196 during an injection cycle. The subject invention is also capable of variably controlling each time interval, delta $T_{3-2}$, between each separate fuel injection segment 194,196 during an injection cycle.

Figure 12:
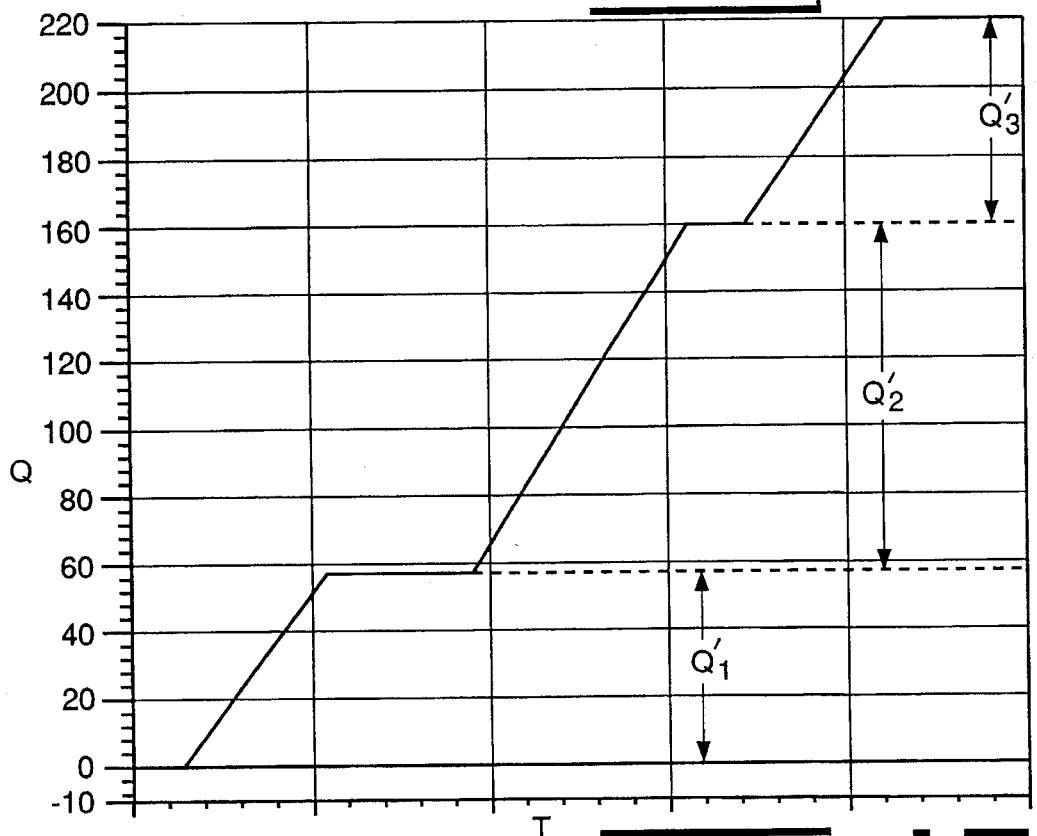
FIG. 12 is a diagrammatic approximate graph of cumulative fuel quantity Q versus time T showing predicted triple-type segmented injection operation during an injection cycle of a computer-simulated exemplary injector of the present invention.
Figure 13:
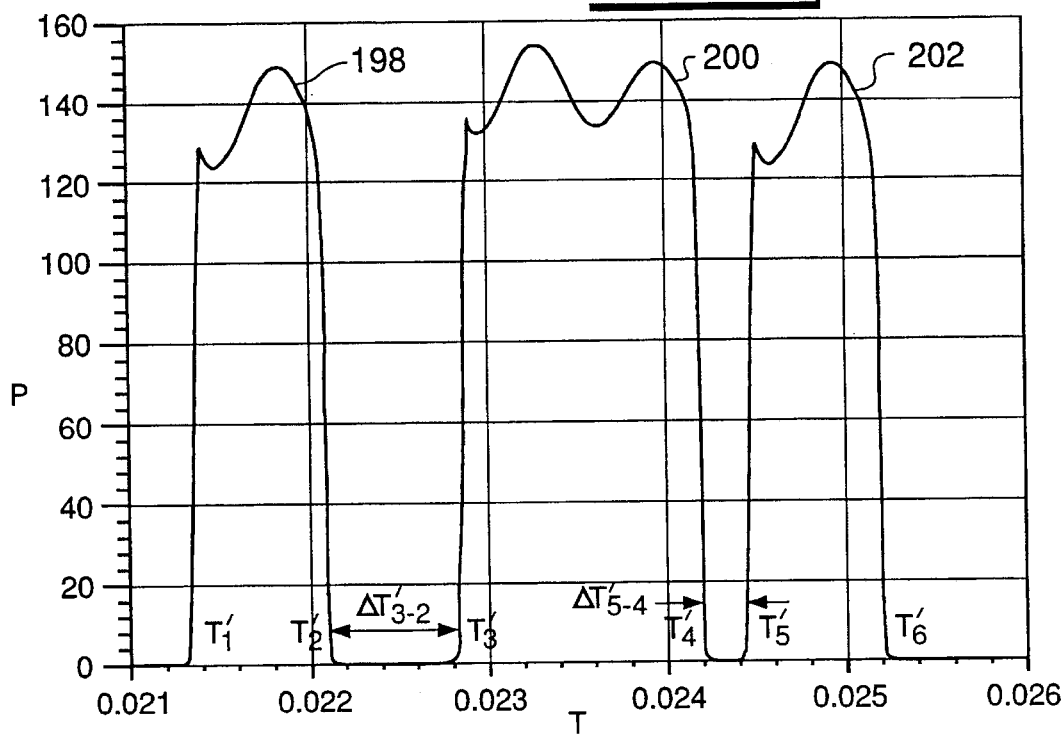
FIG. 13 is a diagrammatic approximate graph of fuel injection pressure P versus time T showing predicted operation corresponding to FIG. 12.

FIG. 12 is a diagrammatic approximate graph of cumulative fuel quantity, Q measured in cubic millimeters, versus time, T measured in seconds, showing predicted triple-type segmented injection operation of a computer-simulated exemplary injector of the present invention. FIG. 13 is a diagrammatic approximate graph of fuel injection pressure, P measured in megapascals, versus time, T measured in seconds, showing predicted operation corresponding to FIG. 12. In FIG. 13, a first injection segment 198, a separate second injection segment 200, and a separate third injection segment 202 are shown. The subject invention is capable of variably controlling the fuel quantity, for example, $Q'_1$ and/or $Q'_2$ and/or $Q'_3$, of each separate fuel injection segment 198, 200,202 during an injection cycle. The subject invention is also capable of variably controlling each time interval, for example, delta $T'_{3-2}$ and/or delta $T'_{5-4}$, between each fuel injection segment during an injection cycle. Moreover, the solenoid 78 can be energized and de-energized once or a selected plurality of times during an injection cycle to produce one or a variably-selected plurality of injection segments.

Other aspects, objects, and advantages of this invention can be obtained from a study of the drawings, the disclosure, and the appended claims.

We claim:

1. A unit fuel injector for receiving fuel at a low supply pressure and for injecting fuel into a combustion chamber of an engine during an injection sequence, comprising:

an injector body having an injector orifice;

means disposed in the body for pressurizing fuel to a selectable level independent of and substantially higher than the supply pressure;

means disposed in the injector body to directly control the injection of pressurized fuel through the orifice into the combustion chamber at a selectable point in the injection sequence, and;

means disposed in the injector body to directly control the end of fuel injection at a selectable point in the injection sequence.

2. The fuel injector of claim 1, wherein the pressurizing means includes a plunger actuable from a location outside the injector body.

3. The fuel injector of claim 2, further including mechanical apparatus for actuating the plunger.

4. The fuel injector of claim 2, further including a high pressure storage volume inside the injector body wherein the plunger is movable within the high pressure storage volume.

5. The fuel injector of claim 4, wherein the plunger is movable toward a travel limit as fuel is being pressurized and wherein the injecting means is actuated to inject fuel as the plunger is moving toward the travel limit.

6. The fuel injector of claim 4, wherein the plunger is movable toward a travel limit as fuel is being pressurized and wherein the injecting means is actuated to inject fuel when the plunger is disposed substantially at the travel limit.

7. The fuel injector of claim 1, wherein the injecting means includes a first valve for controlling delivery of fuel to the pressurizing means and a second valve for controlling delivery of pressurized fuel through the orifice.

8. The fuel injector of claim 7, wherein the injecting means further includes a single actuator for controlling the first and second valves.

9. The fuel injector of claim 8, wherein the actuator comprises a solenoid having a first armature coupled to the first valve and a second armature coupled to the second valve.

10. The fuel injector of claim 7, wherein the first valve comprises a pressure control valve and the second valve comprises a three-way poppet valve.

11. The fuel injector of claim 1, wherein the injecting means comprises a check movable between open and closed positions and means for substantially balancing forces acting on the check in each of the open and closed positions.

12. The fuel injector of claim 11, further including a high pressure storage volume inside the injector body and wherein the check includes first and second check ends and the balancing means comprises first and second passages extending between the high pressure storage volume and the first and second check ends, respectively.

13. The fuel injector of claim 12, wherein the injecting means further includes a poppet valve for selectively coupling the first check end to a low pressure source while the second check end is coupled to the high pressure storage volume when the check is to be moved to the open position.

14. The fuel injector of claim 13, wherein the injecting means further includes a spring which urges the check toward the closed position and wherein the poppet valve recouples the first end of the check to the high pressure storage volume when the check is to be moved to the closed position and wherein such movement occurs under the influence of the spring.

15. The fuel injector of claim 14, wherein the poppet valve is selectively controlled by a solenoid.

16. The fuel injector of claim 15, wherein the pressurizing means includes a pressure control valve also selectively controlled by the solenoid.

17. The fuel injector of claim 16, wherein the solenoid includes first and second armatures coupled to the pressure control valve and the poppet valve, respectively.

18. The fuel injector of claim 17, wherein the armatures are coaxial and spaced from one another with an air gap therebetween and wherein the solenoid includes a winding which, when energized, develops flux that causes the armatures to move toward one another.

19. The fuel injector of claim 18, wherein the solenoid further includes a spring which urges the armatures away from one another.

20. A directly controlled unit injector, comprising:

a first valve for controlling pressurization of fuel;

a second valve for controlling injection of pressurized fuel; and a single actuator for controlling the first and second valves.

21. The unit injector of claim 20, further including an injector body, means responsive to operation of the first valve and disposed in the body for pressurizing fuel to a selectable level and a check disposed in the body and movable in response to operation of the second valve between an injecting position and a non-injecting position.

22. A unit fuel injector adapted to receive fuel from a fuel supply at relatively low pressure and inject fuel at relatively high pressure into a combustion chamber of an internal combustion engine over a series of injector cycles comprising:

(a) an injector body containing an internal bore and an injector valve means;

(b) a plunger mounted for reciprocating movement at varying velocity within said internal bore;

(c) a high pressure storage volume into which fuel is received at low pressure from the fuel supply and from which fuel is discharged periodically at relatively high pressure through said injector valve means into the combustion chamber; and (d) injection control means for causing an amount of fuel to be injected at a selected time through the injector valve at a pressure which is independent of: (1) the pressure of fuel received from the fuel supply; (2) changes in the velocity of the reciprocating movement of said plunger; (3) the amount of fuel delivered through the injector valve means; and (4) the quantity, injection pressure, or timing of previous injection cycles.

23. The unit fuel injector of claim 22, for use in an internal combustion engine having a cam for operating said unit injector wherein said plunger is adapted to reciprocate between travel limits in response to the rotation of the cam.

24. The unit fuel injector of claim 23, wherein said fuel pressurization chamber is located between said plunger and said injection control means.

* * * * *

UNITED STATES PATENT AND TRADEMARK OFFICE
CERTIFICATE OF CORRECTION

PATENT NO. : 5,551,398
DATED : September 3, 1996
INVENTOR(S) : Dennis H. Gibson, et. al.

It is certified that error appears in the above-indentified patent and that said Letters Patent is hereby corrected as shown below:

Title page, item [75], Inventors: after "Sparland," add --Howard N. Cannon, Peoria,--.

Signed and Sealed this

Fourteenth Day of January, 1997

Attest:

BRUCE LEHMAN

Attesting Officer     Commissioner of Patents and Trademarks